(12) United States Patent
Crockett et al.

(10) Patent No.: US 7,233,652 B2
(45) Date of Patent: Jun. 19, 2007

(54) METHOD AND SYSTEM FOR TRANSMITTING A MESSAGE TO A TELEPHONE STATION

(75) Inventors: Susanne Marie Crockett, Buffalo Grove, IL (US); Thomas Joseph McBlain, Arlington Heights, IL (US); John F. Ashley, Morris, IL (US); Casandra A. Wallace, Olympia Fields, IL (US); Timothy Gabriel Cannon, Palatine, IL (US)

(73) Assignee: Ameritech Corp., Hoffman Estates, IL (US)

( * ) Notice: Subject to any disclaimer, the term of this patent is extended or adjusted under 35 U.S.C. 154(b) by 1010 days.

(21) Appl. No.: 09/948,149

(22) Filed: Sep. 6, 2001

(65) Prior Publication Data

US 2003/0043987 A1 Mar. 6, 2003

(51) Int. Cl.
*H04M 3/42* (2006.01)
*H04M 1/64* (2006.01)

(52) U.S. Cl. .............................. 379/207.02; 379/88.19

(58) Field of Classification Search .......... 379/207.02, 379/88.19, 207.14, 207.15
See application file for complete search history.

(56) References Cited

U.S. PATENT DOCUMENTS

| 5,309,512 A | 5/1994 | Blackmon et al. |
| 5,440,541 A | 8/1995 | Iida et al. |
| 5,651,053 A | 7/1997 | Mitchell |
| 5,668,862 A * | 9/1997 | Bannister et al. ...... 379/207.14 |
| 5,729,592 A | 3/1998 | Frech et al. |
| 5,850,435 A | 12/1998 | Devillier |
| 5,875,239 A | 2/1999 | Koralewski et al. |
| 5,995,611 A | 11/1999 | Mowafy et al. |
| 6,154,531 A | 11/2000 | Clapper |

* cited by examiner

*Primary Examiner*—Rasha S. Al-Aubaidi
(74) *Attorney, Agent, or Firm*—Brinks Hofer Gilson & Lione

(57) ABSTRACT

A method and system are disclosed transmitting a message to a telephone station. Different routing strings are used to establish calls between different network elements, based on the location of the network elements with respect to one another. Different time delay periods are associated with the different routing strings so as to offset any differences in the time needed to setup the systems for the transmission of a message to a telephone station. This enables messages to effectively transmitted to the telephone stations so that they are complete and not cutoff.

26 Claims, 4 Drawing Sheets

METHOD AND SYSTEM FOR TRANSMITTING A MESSAGE TO A TELEPHONE STATION

BACKGROUND

The present invention relates generally to telecommunications services and more particularly to the transmission of a message to a telephone station.

Various telecommunications services require messages to be transmitted to telephone stations. One example of such a service is a caller identification service, which transmits information about a calling party to a called telephone station. Another example of such a service is described U.S. Pat. No. 6,219,414 and is commercially available from Ameritech under the name "Talking Call Waiting." This service provides information, in the form of an audible message, to a called party that is engaged in a first call to enable them to decide whether or not they want to put the first call on hold and accept a second call. In this example, the message comprises an audible tone, which indicates that the second call is waiting, and audible information about the caller, preferably the caller's name. To facilitate the delivery of the message to the called party, a telecommunications system will typically perform a series of call set-up or configuration steps that enable the message to be transmitted to the called party's telephone station. For example, once it has been determined that the message is to be transmitted to the called telephone station, a communication channel must be established between the network element that generates the message and the called telephone station so that the message can be transmitted from the network element to the called telephone station.

Both the generation of the message and the setup of the connection that enables the transmission of the message to the called telephone station take time to complete, and the time needed to complete these actions can vary depending upon the physical location of the called telephone station and the network element that is generating the message. Any variance in the generation of the message or the setup of the transmission connection can adversely affect the delivery of the message to the called party, as both the generation of the message and the setup for the transmission of the message must be synchronized to effectively deliver the message to the called party. If the message is generated before the setup is complete, the message can be cut off.

A system and method for transmitting a message to a telephone station that overcome these timing issues are needed.

DETAILED DESCRIPTION OF THE PRESENTLY PREFERRED EMBODIMENTS

Figure 1:
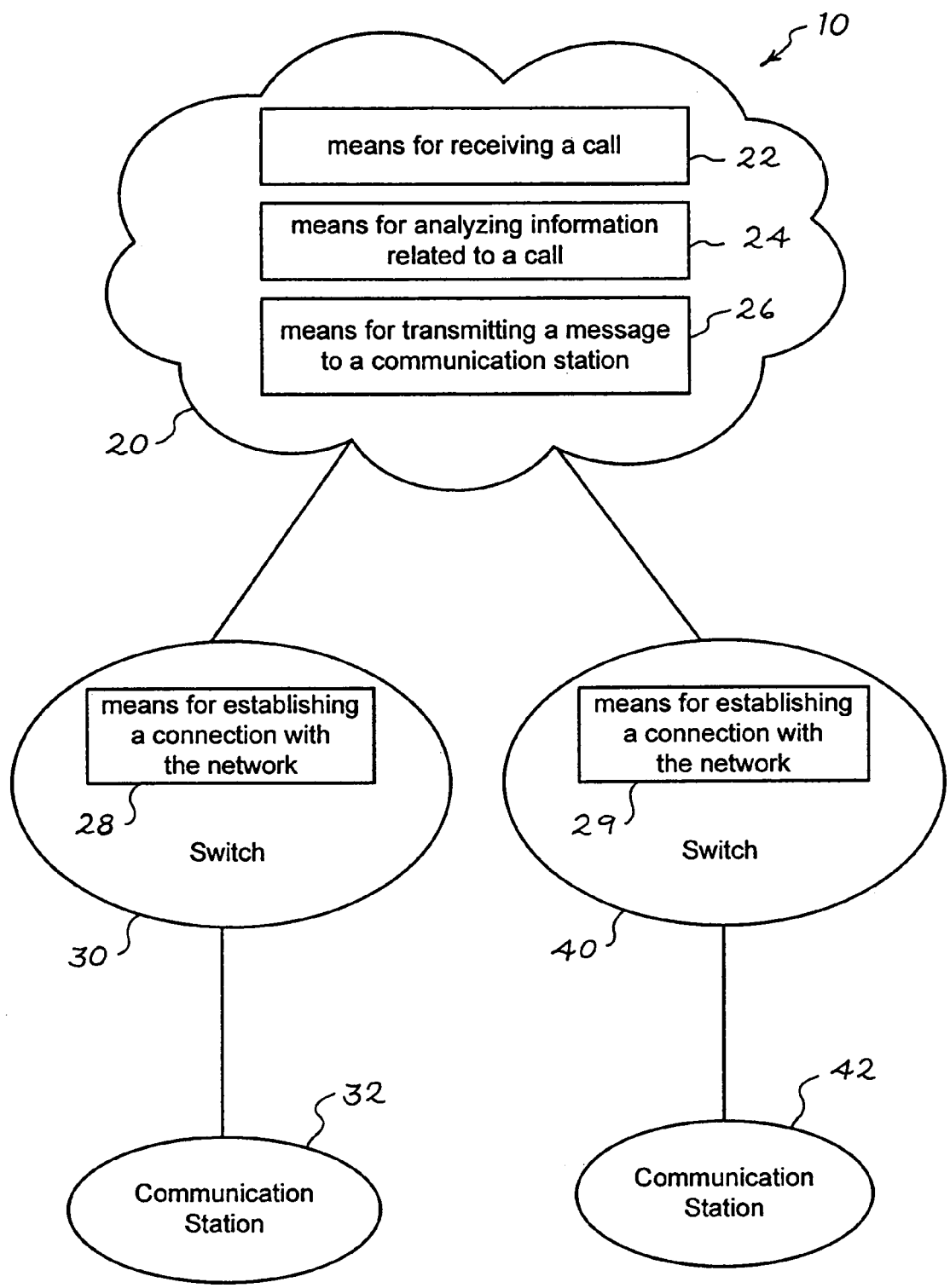
FIG. 1 is a block diagram of a system for transmitting a message to a telephone station of a preferred embodiment.

By way of introduction, FIG. 1 depicts a system 10 of a preferred embodiment. The system 10 comprises a network 20 that can be coupled with a first switch 30 and a second switch 40, which are located in separate local access and transport areas (LATAs). A first communication station 32 is coupled with the first switch 30 and a second communication station 42 is coupled with the second switch 40. The phrase "coupled with," as used herein, means coupled either directly or indirectly via one or more intervening elements.

The network 20 preferably comprises a telecommunications network. Alternatively, the network 20 can comprise a computer network or any other network that is adapted to store and retrieve information and facilitate point to point communications. The network 20 preferably further comprises means for receiving a call 22, means for analyzing information related to the call 24, and means for transmitting a message to the communication stations 26. The first and second switches 30, 40 preferably comprise means for establishing a connection with the network 28, 29. Because the switches 30, 40 are located in different LATAs, they can utilize different routing strings to establish a connection with the network 20. The communication stations 32, 42 preferably comprise respective analog telephone stations, but can comprise any suitable communication station adapted for use in the present embodiments. Each of the means 22, 24, 26, 28, 29 described above is preferably implemented through the use of computer readable program code written in any suitable programming language and implemented on an analog or digital computer utilizing any suitable operating system. Alternatively, each of the means 22, 24, 26, 28, 29 can be implemented through the use of hardware in the form of a hardwired computer, a processor, an integrated circuit, or a combination of hardware and computer readable program code.

The system 10 enables a message to be efficiently and effectively transmitted to communication stations 32, 42. The system 10 can coordinate and synchronize the generation and transmission of messages to communication stations 32, 42 by analyzing information related to a connection that is established between the network 20 and switches 30, 40. The switches 30, 40 utilize different predetermined routing strings to establish a connection with the network 20 because they are in different LATAs. In this example switch 30, and more particularly means 28, are operative to utilize a first routing string to establish a connection with the network 20, while switch 40, and more particularly means 29, are operative to utilize a second routing string to establish a connection with the network 20. Network 20 can analyze information related to a connection that is established between the network 20 and switches 30, 40 to determine an appropriate delay time period needed to effectively transmit a message to communication stations 32, 42. In response to this analysis, a delay time period can be set, and a message can be transmitted to communication station 32, 42 after the delay time period has expired. In this case the time delay associated with the connection between the network 20 and switch 30 will be different from the time delay associated with the connection between the network 20 and switch 40 because of the different routing strings used by the switches 30, 40 to establish connections with the network 20.

Figure 2:
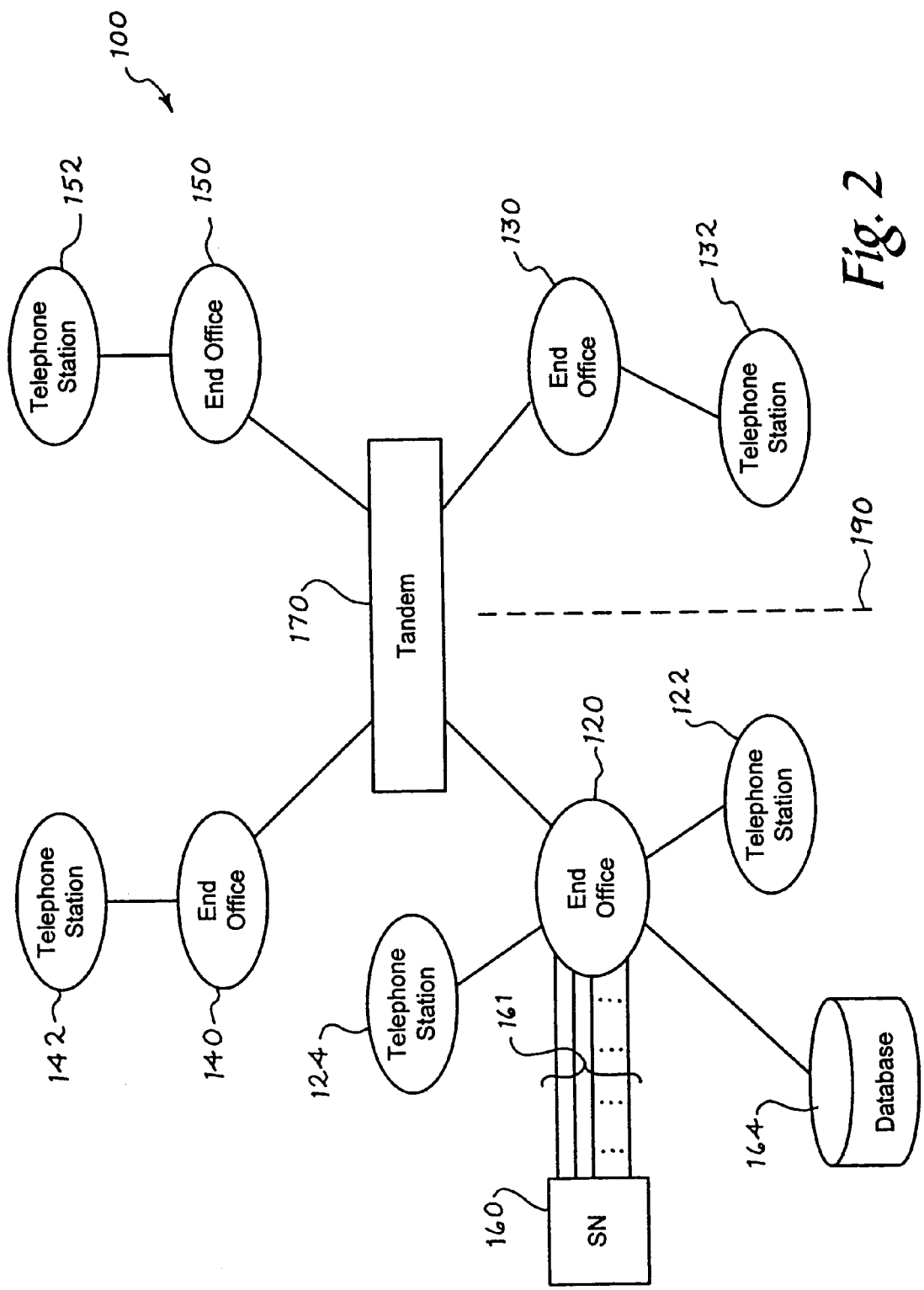
FIG. 2 is more detailed block diagram of the system depicted in FIG. 1.

By way of example, FIG. 2 depicts a preferred embodiment of the system described above. The system 100 comprises the following network elements: end offices 120, 130, 140, 150, a service node (SN) 160, a database 164, a tandem switch 170, and telephone stations 122, 132, 142, 152. The end offices 120, 130, 140, 150 are coupled with the tandem switch 170, through the use of standard trunking, to facilitate the routing of calls between the end offices 120, 130, 140, 150. The end offices 120, 130, 140, 150 are also coupled with their respective telephone stations 122, 124, 132, 142, 152 to enable customers at telephone stations 122, 124, 132, 142, 152 to place calls to and receive calls from one another. The SN 160 is preferably coupled with the end office 120 via a plurality of primary rate interfaces (PRIs) 161. In this example, end office 120 and end office 130 are located in separate local access and transport areas (LATAs), which are graphically depicted by dividing line 190.

End offices 120, 130, 140, 150 preferably comprise network switches that receive and route calls as known by those skilled in the art. In an alternative embodiment, end offices 120, 130, 140, 150 can comprise advanced intelligent network (AIN) network switches, such as those available from Lucent Technologies, which are commonly known as service switching points (SSPs). End offices 120, 130, 140, 150 can generate outgoing calls to other network elements using routing strings that can include a predetermined telephone number. End offices 120, 130, 140, 150 preferably utilize the predetermined telephone number in the routing strings to generate outgoing calls to the other network elements, including SN 160. Because the end offices 120, 130 are located in different LATAs, they can utilize different routing strings, which include different telephone numbers, to generate outgoing telephone calls to different network elements, such as SN 160. The use of a first routing string or telephone number can cause the outgoing call to be established via a first PRI, while the use of a second routing string or telephone number can cause the call to be established via a second PRI, as discussed in more detail below. End offices 120, 130, 140, 150 can also initiate the retrieval of data from database 164, as described in more detail below. In a preferred embodiment, the end offices 120, 130, 140, 150 are operative to initiate a PRI lookup that facilitates the retrieval of data from database 164.

SN 160 preferably comprises a network element that stores call control information and performs call related functions. SN 160 is preferably coupled with end office 120 via a plurality of PRIs 161 and has a plurality of incoming ports that are connected with the PRIs 161. SN 160 receives calls generated by end offices 120, 130, performs searches, and analyzes data. SN 160 can also return information or data to end offices 120, 130 and can generate call waiting indicators that can be transmitted to telephone stations 122, 124, 132, 142, 152, as described herein. SN 160 can also include a text to speech module that performs text to speech conversions to produce an audible representation of textual information or data. Such modules and conversions are well known by those skilled in the art. SN 160 can also record information, such as audible messages transmitted from telephone stations 122, 124, 132, 142, 152, and can replay such information for transmission to telephone stations 122, 124, 132, 142, 152.

SN 160 can analyze information related to calls generated by end offices 120, 130. For example, SN 160 can analyze the incoming port used for an outgoing call that is generated by and transmitted from end office 120, 130 to determine a delay time period that can be used for further processing of the call. SN 160 can determine which PRI was used to establish the call between SN 160 and end offices 120, 130 and can access stored data that correlates a delay time period to the PRI used to establish the different calls.

Database 164 preferably comprises a caller identification with name database as known by those skilled in the art. Database 164 preferably stores information associated with calling telephone numbers. The information associated with the telephone number preferably comprises the identity of a caller in the form of the caller's name. Alternatively, the information associated with the telephone number can comprise the identity of a caller in the form of the caller's name and the telephone number for the calling telephone station. The telephone number preferably comprises a 10 digit telephone number, but can also comprise any type of identification format used to identify telephone stations. Database 164 can alternatively comprise a caller assistance database as known by those skilled in the art. In alternative embodiments, database 164 can store other types of data as well. For example, database 164 can store textual or audible data that can comprise information associated with the called telephone station or instructions or announcements that can be used in conjunction with a telecommunications service. While database 164 is depicted within a telecommunications system, database 164 can comprise any suitable database containing information adapted for use in the present embodiment and is not limited to databases located within a telecommunications network.

Tandem switch 170 preferably comprises a network element that facilitates the routing of calls between end offices 120, 130, 140, 150. Tandem switch 170 is preferably operative to facilitate the routing of calls across LATA boundaries. While one tandem switch is depicted in the present embodiment, more than one tandem switch can be used in alternative embodiments. In further alternative embodiments, direct trunk loops can be used in place of the tandem switch.

Telephone stations 122, 124, 132, 142, 152 preferably comprise analog telephone sets. Alternatively, telephone stations 122, 124, 132, 142, 152 can comprise wireless, PCN, ISDN, a computer, or any other form of communication station known by those skilled in the art.

Figure 3:
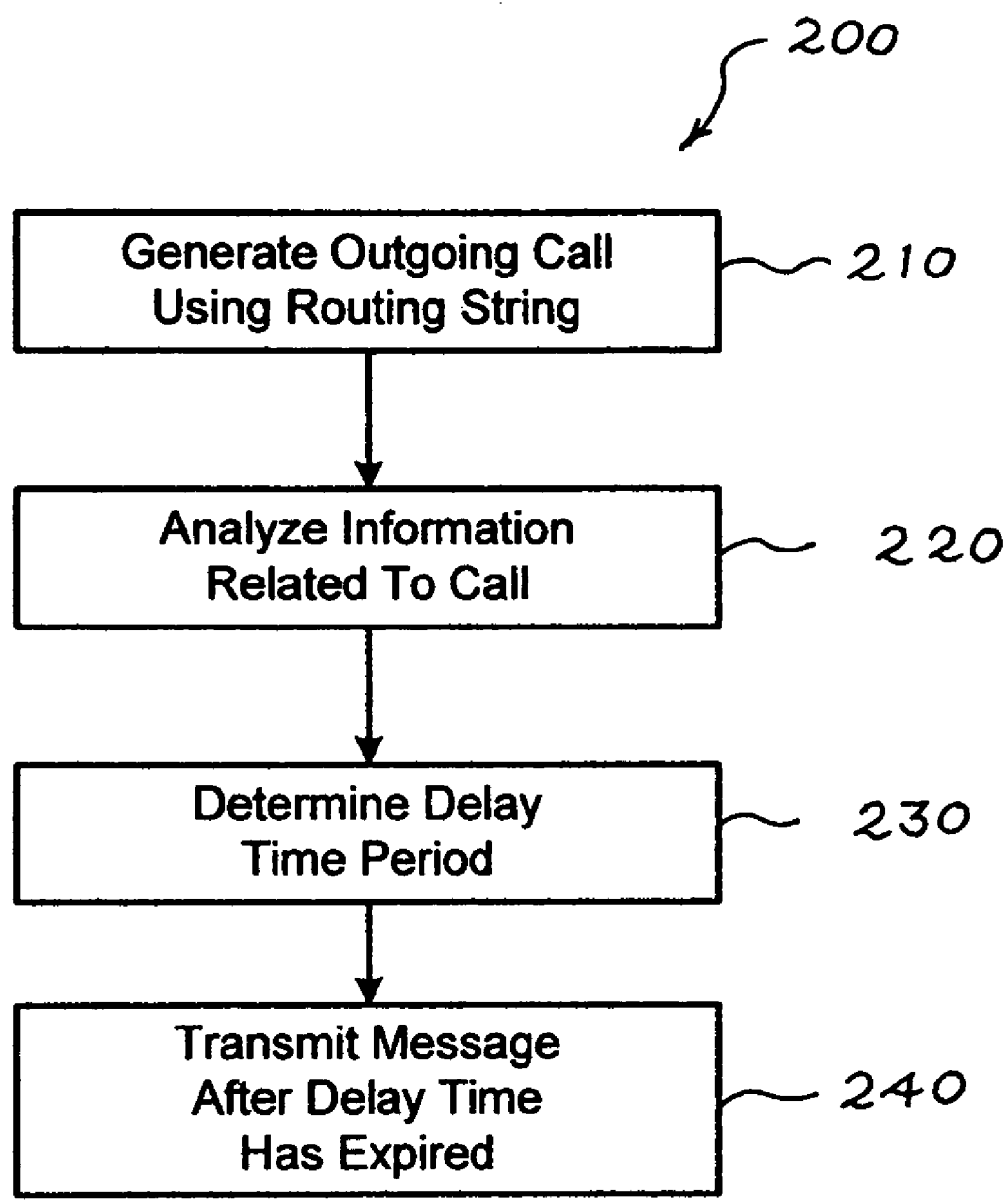
FIG. 3 is a flow chart of a method for transmitting a message to a telephone station of a preferred embodiment.

The systems depicted in FIGS. 1 and 2 can be utilized to implement the method 200 depicted in FIG. 3. For purposes of illustration, assume that a call has been placed to the telephone station 122 (FIG. 2) and the call has been routed to end office 120 (FIG. 2). Once the incoming call has been received at the end office 120, the end office 120 generates an outgoing telephone call to SN 160 (act 210, FIG. 3). When the SN 160 receives the outgoing call, it analyzes information related to the outgoing call (act 220) and determines a delay time period (act 230). After the delay time period has expired, the SN 160 transmits a message to the telephone station 122 (act 240). Each of these acts is described in more detail below.

The act of generating the outgoing telephone call (act 210) can be initiated by the occurrence of one of several different events. For example, the act of generating the outgoing telephone call can be initiated when the called party at telephone station 122 is busy on a previous call. If the end office 120 cannot terminate the call to telephone station 122 because the called party at telephone station 122 is busy on a previous call, end office 120 can generate the outgoing telephone call to SN 160 in accordance with a conference call type feature or other similar function. Conference call type features and other similar functions are well known by those skilled in the art and can comprise a preexisting feature of the end office 120. The conference call type feature utilizes a routing string that enables end office 120 to generate the outgoing telephone call to SN 160 by dialing a predetermined telephone number that is included within the routing string. In response to the number dialed by end office 120, a call will be established between end office 120 and SN 160 via a PRI. In alternative embodiments, outgoing telephone calls can be generated to network elements other than the SN 160.

In addition to generating the outgoing telephone call to SN 160, end office 120 can also initiate a PRI lookup that results in information or data being retrieved from database 164. The information or data retrieved from database 164 can be transmitted to SN 160 and can be used by SN 160 to transmit a message to telephone station 122. For example, the PRI lookup can result in the retrieval of textual information or data that can be transmitted to SN 160. SN 160 can utilize the text to speech module to convert the textual information or data to audible information and can transmit that audible information or data to telephone station 122. SN 160 can also transmit the textual information or data to telephone station 122 in a text format.

After the outgoing telephone call has been generated by the end office 120 (act 210), the SN 160 can analyze information related to the call (act 220) and determine a delay time period (act 230). For example, if the end office 120 dials a predetermined telephone number to generate the outgoing telephone call and the call is established between the end office 120 and the SN 160 via a PRI that is associated with the predetermined telephone number used by the end office 120, the SN 160 analyzes the PRI through which the call from the end office 120 has been established. After the SN 160 has determined the PRI used to establish the outgoing call, the SN 160 can determine a delay time period associated with that PRI by accessing stored data. The stored data correlates one or more delay time periods to one or more PRIs. For example, end office 120 and end office 130 can use different routing strings, and accordingly different telephone numbers, to generate outgoing telephone calls to SN 160. The use of different telephone numbers results in the calls being established with the SN 160 via different PRIs. After the SN 160 receives a call that is generated by end office 120 or end office 130, the SN 160 can access the stored data to determine the time delay period associated with the PRI used to establish the call that originated from end office 120 or to determine the time delay period associated with the PRI used to establish the call that originated from end office 130.

After the time delay period has been determined, the system of FIGS. 1 and 2 can begin the setup and configuration procedures for enabling a message to be transmitted from the SN 160 to the telephone station 122 (act 240). In the present example, in order to facilitate the transmission of such a message a communication channel needs to be established between the SN 160 and the telephone station 122. At the same time that the call set up is initiated, the SN 160 monitors the amount of time that has passed. Once the delay time period has passed, the SN 160 transmits a message to the telephone station 122. The SN 160 can transmit the message, for example, by converting the textual information or data retrieved from database 164 into a audible format using the text to speech module. The audible message can then be transmitted to the telephone station 122. Because of the time delay period, the transmission of the message is coordinated with the call setup such that the customer at telephone station 122 can hear the entire message without any of the message being cut off.

In an alternative embodiment to the method depicted in FIG. 3, if a call is placed to telephone station 132 the call is routed to end office 130. Upon receipt of the call, end office 130 can generate an outgoing telephone call to SN 160. However, because end office 130 is in a different LATA than 120, end office 130 can utilize a different routing string to generate the outgoing telephone call to SN 160. The end office 130 can utilize the routing string and a predetermined telephone number to generate the outgoing call to SN 160. The outgoing call can be routed from the end office 130 to the tandem switch 170, then to end office 120, and to SN 160. The end office 120 will establish the call to SN 160 using a different PRI because the end office 130 used a different routing string and telephone number to generate the outgoing call, as compared the routing string and telephone number used by end office 120 in the example discussed above. Upon receipt of the call from end office 120, SN 160 can determine the PRI used by end office 120 to establish the call and can determine the delay time period that is associated with that PRI. SN 160 can determine the PRI used by the end office 120 by analyzing the incoming port through which the call is received at the SN 160. Because end office 130 used a different telephone number to generate the outgoing call and because end office 120 used a different PRI to establish the call to SN 160, the call will be received at SN 160 via a different incoming port. Accordingly, a different delay time period will be associated this call. SN 160 can monitor the delay time period and can transmit a message to communication station 132 after the delay time period has expired.

In this example, the call setup procedures would take longer to complete because the end office 130 is located in a different LATA than the SN 160. Since the end office 130 is in a different LATA, a communication channel must be established between SN 160, end office 120, tandem switch 170, end office 130, and telephone station 132. If this communication channel is set up using normal trunking, it will take more time to complete the setup than it would to complete the setup for transmitting a message to a telephone station at end office 120, as discussed above. Accordingly, the additional delay time period associated with the PRI that is used to establish this call to SN 160 allows for the additional call setup to be completed such that the message is transmitted to telephone station 132 without being cutoff. The remainder of the acts described above, including the acquisition of data from the database 164 can be performed as described above. Accordingly, the end office 130 can initiate a PRI lookup that results in information or data being retrieved from database 164, and that information or data can be transmitted to SN 160.

The message transmitted by the SN 160 in all of the examples discussed herein can comprise both text messages and audible messages. The message can comprise information that is transmitted to a customer, such as information about a calling party, information about options for processing the call, such as a listing of actions that can be taken in response to a user pushing one or more of the keys on a touchtone telephone, or other information. The message can also comprise a request for the customer to transmit audible or text information back to the system. For example, the message can request that the customer provide a voice command or provide other commands or information by entering keys on their telephone or the like.

The systems depicted in FIGS. 1 and 2 can also be used in conjunction with an audible caller identification system, such as the one disclosed in U.S. Pat. No. 6,219,414, which is incorporated by reference, to deliver audible messages to telephone stations 122, 132, as described below. For purposes of illustration, assume that a customer at telephone station 122 is on a previous call with a previous calling party at telephone station 152. Connections to establish the previous call are created between: telephone station 152 and end office 150; end office 150 and end office 120; and end office 120 and telephone station 122. Also, assume that after the previous call has been commenced, a current calling party at telephone station 142 places a current call to the customer at telephone station 122. In an attempt to connect the current call, end office 140 routes the current call to end office 120.

Once the incoming call has been received at the end office 120, end office 120 determines that the customer at telephone station 122 is busy on a previous call. An outgoing call to SN 160 is automatically generated by end office 120. The outgoing telephone call is generated in response to the telephone number contained within a routing string. The outgoing call is then established with SN 160 via a PRI that is associated with the telephone number used by end office 120. This establishes a 3-way virtual call and conferences the SN 160 into the existing call between telephone stations 122 and 152. The end office 120 also initiates a PRI lookup that results in data being retrieved from database 164. In this example, the data preferably comprises a textual representation of the name associated with the calling telephone station 142. The textual data is then transmitted to SN 160. Once the outgoing call has been received by SN 160 the SN 160 analyzes the incoming port through which the call is established with SN 160 to determine the PRI that was used by end office 120 to establish the call. After the SN 160 has determined the PRI used to establish the call, the SN 160 can determine a corresponding delay time period by accessing stored data. After the appropriate delay time period has been determined, SN 160 allows the delay time period to begin to run and initiates the setup procedures for enabling a message to be transmitted from the SN 160 to the telephone station 122. A preferred delay period in this example is zero (0) seconds.

In the present example, in order to facilitate the transmission of such a message, the previous calling party at telephone station 152 must be placed on hold and a communication channel needs to be established between the SN 160 and the telephone station 122. Once the time delay period has expired, the SN 160 transmits the message to the telephone station 122. This enables the transmission of the message to be synchronized with the telephone station 152 being placed on hold so that the message can be effectively transmitted to the telephone station 122. In this example, the message preferably comprises a call waiting indicator tone and the audible name of the person associated with the telephone station 142. The audible name is generated by the SN 160 through the use of text to speech module. In alternative embodiments, other messages, including but not limited to the name and the telephone number associated with telephone station 142, can also be transmitted.

In a variation of the above example, it should be understood that a calling party and a called party can be coupled with the same end office. Accordingly, as shown in FIG. 2, a caller at telephone station 124 can place a call to a party at telephone station 122 that would result in the implementation of the method described above.

In a further variation of the above examples, if the calling party at telephone station 142 were trying to reach a customer at telephone station 132 and the customer was already on a previous call with a previous caller, the above method would be repeated except that end office 130 would utilize a different routing string to generate the outgoing telephone call to SN 160. Accordingly, the end office 130 would utilize a different telephone number to generate an outgoing telephone call to SN 160. The outgoing telephone call would be routed from end office 130 to tandem switch 170, then to end office 120, and finally to SN 160. Because end office 130 utilized a different telephone number to generate the outgoing telephone call, end office 120 would establish the outgoing call to SN 160 via a different PRI. The use of this different PRI would result in the SN 160 determining a different delay time period for this call. In this case, the delay time period would be longer so that more time would elapse before a message is transmitted to the telephone station 132. In this example, the preferred delay time period is one (1) second. This increased delay time period would offset the addition time needed to setup the network for the transmission of the message from SN 160 to the telephone station 132, via regular trunking, which results from the telephone station being in a LATA that is remote from the LATA that the SN 160 is in. Thus, the additional delay allows time for the call setup to be completed so that the transmission of the message to telephone station 132 can be synchronized with placing the previous caller on hold. Accordingly, the message can be delivered to the telephone station 132 such that the called party can hear the entire message and none of it is cutoff.

Figure 4:
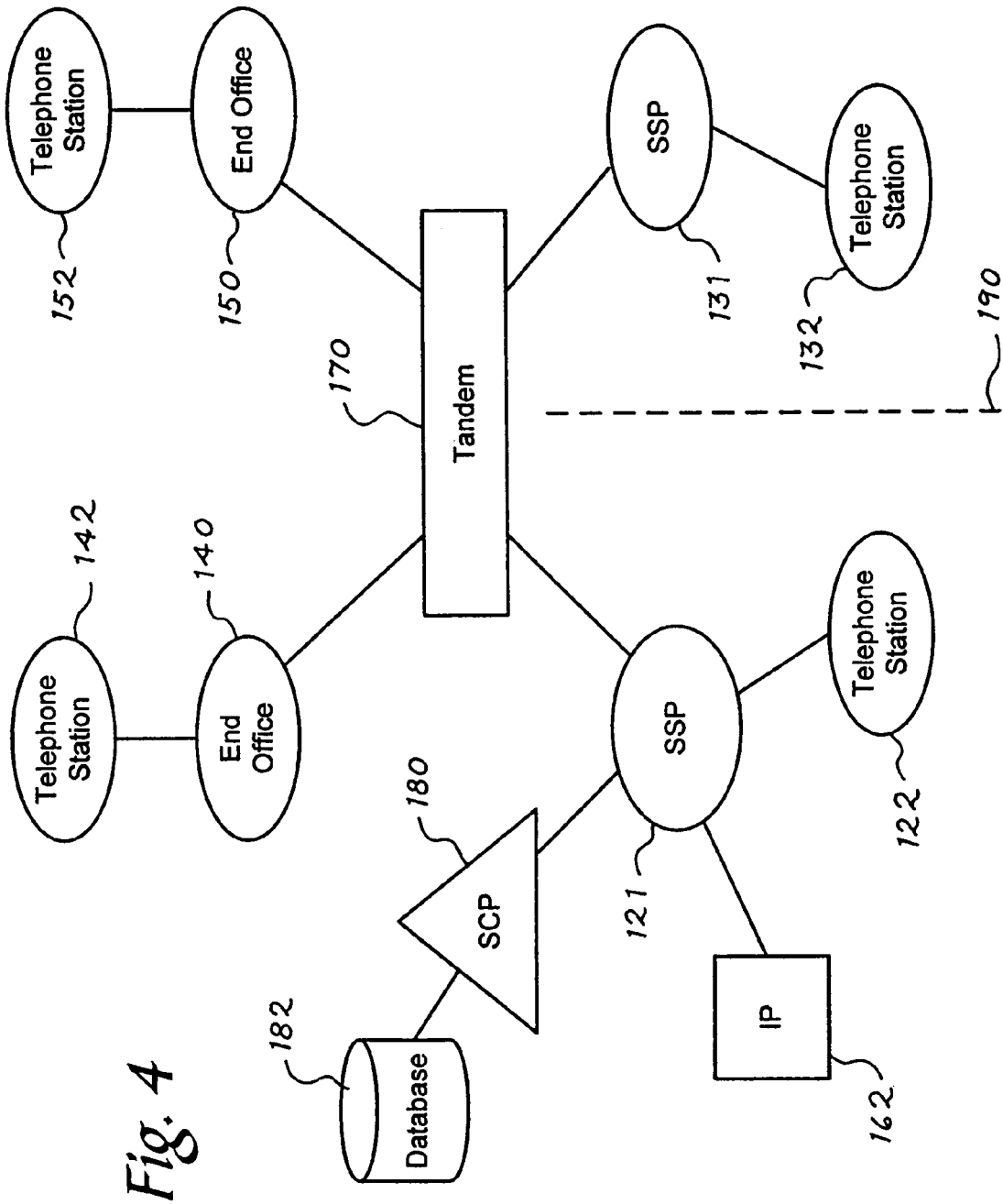
FIG. 4 is a block diagram of an alternative embodiment of the system of FIG. 2.

Referring now to FIG. 4, an alternate embodiment of the system of FIG. 2 is depicted. In this embodiment, an intelligent peripheral (IP) 162 is used in place of the SN 160, and service switching points (SSPs) 121, 131 are used in place of end offices 120, 130. Also, a service control point (SCP) 180 and an SCP database 182 are coupled with the SSP 121. The IP 162 preferably comprises a network element that performs call related functions. IP 162 can receive calls, instructions, and data transmitted from SSPs 121, 131 and can perform various functions in response to the instructions received from SSPs 121, 131. For example, IP 162 can transmit messages to telephone stations 122, 124, 132, 142, 152. IP 162 can also include a text to speech module that performs text to speech conversions to produce an audible representation of text. IP 162 can also record information, such as audible messages transmitted from telephone stations 122, 124, 132, 142, 152, and can replay such information for transmission to telephone stations 122, 124, 132, 142, 152.

SSPs 121, 131 preferably comprise AIN switches that route calls, generate queries to SCP 180 to obtain call control instructions, and respond to call control instructions. SSPs 121, 131 connect telephone stations 122, 132 with end offices 140, 150 to enable customers to place calls to and receive calls from telephone stations 142, 152. SSPs 121, 131 preferably communicate with SCP 180, end offices 140, 150, and IP 162 in accordance with a signaling protocol such as Signaling System 7 (SS7) or other such signaling protocols as known by those skilled in the art.

SCP 180 preferably comprises an AIN element that stores call control instructions in SCP database 182 and accesses the stored call control instructions. SCP 180 receives queries generated by SSPs 121, 131 and preferably responds to the queries by performing database searches to locate the requested call control instructions. SCP 180 can forward the located call control instructions to SSPs 121, 131.

In a further alternative embodiment, a different SN could be associated with each of the different routing strings used by the switches to generate the outgoing telephone calls. Accordingly, the use of a first routing string would result in the generation of an outgoing telephone call to a first SN, while the use of a second routing string would result in the generation of an outgoing telephone call to a second SN.

The present embodiments provide an efficient and effect method and system for transmitting a message to a telephone station. The present embodiments utilize different routing strings to establish calls between different network elements, based on the location of the network elements with respect to one another. Different time delay periods are associated with the different routing strings so as to offset any differences in the time needed to setup the systems for the transmission of a message to a telephone station. This enables messages to effectively transmitted to the telephone stations so that they are complete and not cutoff.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A method of transmitting a message to a telephone station, the method comprising:
    (a) receiving a telephone call;
    (b) generating an outgoing telephone call using a predetermined routing string in response to (a);
    (c) analyzing information related to the outgoing telephone call;
    (d) determining a delay time period in response to the analysis of (c); and
    (e) automatically transmitting a message to the telephone station after the delay time period has expired.

2. The method of claim 1, wherein (b) comprises generating an outgoing telephone call to a service node using a predetermined routing string.

3. The method of claim 1, wherein (b) comprises generating an outgoing telephone call using a predetermined telephone number.

4. The method of claim 1, wherein (b) further comprises establishing the outgoing telephone call using a predetermined primary rate interface that is selected in response to the predetermined telephone number.

5. The method of claim 1, wherein (c) comprises determining an incoming port through which the outgoing telephone call was received.

6. The method of claim 1, wherein (c) comprises determining an primary rate interface through which the outgoing telephone call was received.

7. The method of claim 1, wherein (d) comprises:
    (d1) accessing stored data that associates a first delay time period with a first primary rate interface and that associates a second delay time period with a second primary rate interface; and
    (d2) selecting the first or second delay time period in response to (c).

8. The method of claim 1, wherein (e) comprises:
    (e1) coupling a service node with the telephone station; and
    (e2) automatically transmitting a message from the service node to the telephone station after the delay time period has expired.

9. The method of claim 1, wherein (e) comprises automatically transmitting an audible message to the telephone station after the delay time period has expired.

10. The method of claim 1, wherein (e) comprises automatically transmitting a text message to the telephone station after the delay time period has expired.

11. The method of claim 1, wherein the delay time period is determined such that transmission of the message to the telephone station begins after a time required for call setup to the telephone station, wherein the message can be transmitted to the telephone station without any of the message being cut off.

12. A system for transmitting a message to a telephone station, the system comprising:
    a network element that is operative to:
    (a) receive a call that is generated by a switch;
    (b) analyze information related to the call;
    (c) determine a delay time period in response to the analysis of the information related to the call; and
    (d) automatically transmit a message to the telephone station after the delay time period has expired.

13. The system of claim 12, wherein the network element is further operative to determine a primary rate interface used by the switch to establish the call.

14. The system of claim 12, wherein the network element is further operative to access stored data that associates a first delay time period with a first primary rate interface and that associates a second delay time period with a second primary rate interface and select the first or second delay time period in response to the analysis of the information related to the call.

15. The system of claim 12, wherein the network element is operative to automatically transmit an audible message to the telephone station after the delay time period has expired.

16. The system of claim 12, wherein the network element is operative to automatically transmit a text message to the telephone station after the delay time period has expired.

17. The system of claim 12, wherein the network element comprises a service node.

18. The system of claim 12, wherein the delay time period is determined such that transmission of the message to the telephone station begins after a time required for call setup to the telephone station, wherein the message can be transmitted to the telephone station without any of the message being cut off.

19. A method of transmitting a message to a telephone station, the method comprising:
    (a) receiving an incoming telephone call at a switch;
    (b) placing an outgoing telephone call from the switch to a service node using a predetermined telephone number;
    (c) connecting the switch with the service node using a predetermined primary rate interface that is selected in response to the predetermined telephone number;
    (d) using the service node to determine the primary rate interface used to connect the switch with the service node;
    (e) selecting a delay time period in response to the primary rate interface used to connect the switch with the service node; and
    (f) automatically transmitting a message to the telephone station after the delay time period has expired.

20. The method of claim 19, wherein (d) comprises analyzing an incoming port to determine the primary rate interface used to connect the switch with the service node.

21. The method of claim 19, wherein (e) comprises:
    (e1) accessing stored data that associates a first delay time period with a first primary rate interface and that associates a second delay time period with a second primary rate interface; and
    (e2) selecting the first or second delay time period in response to the primary rate interface used to establish the outgoing telephone call.

22. The method of claim 19, wherein (f) comprises:
    (f1) connecting the service node with the telephone station after the delay time period has expired; and
    (f2) transmitting a message from the service node to the telephone station.

23. The method of claim 19, wherein (f) comprises automatically transmitting a name of a calling party to the telephone station after the delay time period has expired.

24. The method of claim 19, wherein (f) comprises automatically transmitting a call waiting indicator and a name of a calling party to the telephone station after the delay time period has expired.

25. The method of claim 19, wherein the delay time period is selected such that transmission of the message to the telephone station begins after a time required for call setup to the telephone station, wherein the message can be transmitted to the telephone station without any of the message being cut off.

26. A computer usable medium having computer readable program code embodied therein for transmitting a message to a telephone station, the computer readable program code comprising:

a first computer readable program code for causing a computer to generate an outgoing telephone call using a predetermined routing string;

a second computer readable program code for causing a computer to analyze information related to the outgoing telephone call and determine a delay time period in response to the analysis; and a third computer readable program code for causing a computer to automatically transmit a message to the telephone station after the delay time period has expired.

* * * * *